Nov. 6, 1951  R. L. SHERRICK  2,574,195
APPARATUS TO EXPAND AND MOUNT SOLID RESILIENT
TIRES ON CHANNELLED WHEELS OR RIMS
Filed Feb. 27, 1946
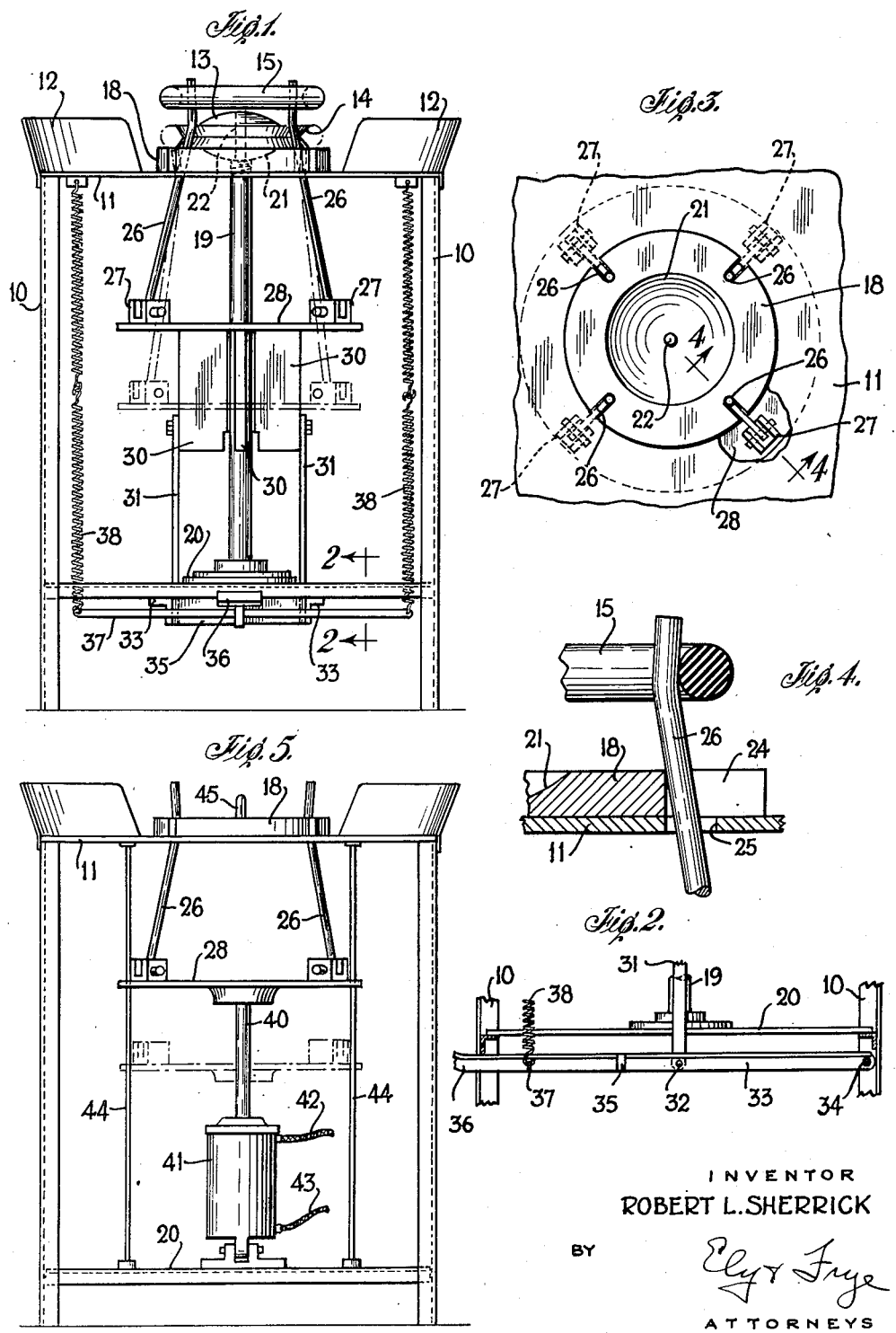
INVENTOR
ROBERT L. SHERRICK
BY
*Ely & Frye*
ATTORNEYS Patented Nov. 6, 1951

2,574,195

UNITED STATES PATENT OFFICE 2,574,195

APPARATUS TO EXPAND AND MOUNT SOLID RESILIENT TIRES ON CHANNELED WHEELS OR RIMS

Robert L. Sherrick, Akron, Ohio

Application February 27, 1946, Serial No. 650,411

2 Claims. (Cl. 157—1.1)

This invention relates to tire mounting apparatus and more especially it relates to apparatus for mounting endless tires of rubber or rubber-like material upon wheel rims that are provided with grooves in which the tires are received.

The invention is of primary utility for mounting small endless rubber tires upon the wheels of baby carriages, scooters, velocipedes, toy wagons and the like wherein the wheels have tire-receiving rims which have greater over-all diameter than the inside diameter of the tires to be mounted thereon. At one time, tires of the character mentioned were made in continuous length and formed with an axial aperture. The tire material, after vulcanization, was cut into shorter lengths suitable for a single tire, and mounted on a wheel rim by means of a wire cable that was inserted through the tire, the ends of the cable being joined during the assembling of the tire with the rim. The arrangement was not entirely satisfactory since a gap was left in the tire at the juncture of the cable-ends.

Subsequently the tires were made in endless form, and composed of solid rubber with no axial aperture or cable therein. This resulted in a new tire-mounting problem, and it was common practice to deform one side of the rim sufficiently to pass the tire thereover, and thereafter to re-shape the rim to its original form. The procedure was laborious and time-consuming, and it is to the relief of these conditions that this invention primarily is directed.

The chief objects of the invention are to provide improved apparatus for mounting an endless tire of rubber-like material upon a wheel rim; to provide apparatus of the character mentioned that is simple in construction and rapid and efficient in operation; to provide apparatus that does not mar the rim and does not unduly strain the tire; and to save time and labor in the mounting of the tires. Other objects will be manifest as the description proceeds.

Of the accompanying drawing:

Fig. 1 is a front elevation of apparatus embodying the invention, and the work therein, ready for operation;

Fig. 2 is a fragmentary section of the apparatus on the line 2—2 of Fig. 1 showing an operating pedal;

Fig. 3 is a fragmentary plan view of the apparatus on a larger scale, showing the work-supporting elements;

Fig. 4 is a section, on a larger scale, on the line 4—4 of Fig. 3; and

Fig. 5 is a side elevation of another embodiment of the invention.

Referring to Figs. 1 to 4 of the drawing, there is shown a table comprising the usual legs 10, 10 and a top 11, the latter adapted to hold work-pieces to be assembled and provided with a marginal flange 12 to prevent said work-pieces from falling therefrom. The work-pieces consist of a wheel 13 having the usual marginal groove 14 to receive a tire, and 15 is a tire that is receivable in said groove.

Positioned upon the table top 11 is a circular work-support 18 for a wheel 13, said work-support preferably being located at the geometric center of said table top and removably secured in place by a rod or post 19 that is axially threaded thereinto from the under side thereof, said post extending downwardly through a suitable aperture in the table top and having its lower end connected to a shelf-like structure 20 near the bottom of the table. The top face of the work-support 18 is formed with a centrally disposed concavity or dished portion 21 in which a convex side of a wheel structure 13 is receivable so that the rim portion of the wheel in which the marginal groove 14 is located may rest flush upon the top surface of the work-support, as is clearly shown in Fig. 1. The upper end of the post 19 is provided with an axial stud or pilot 22 that extends through the work-support and upwardly therefrom, said pilot adapted to extend through the usual axle opening in a wheel 13 to center the latter upon the work-support.

The periphery of the work-support 18 is formed with a plurality of radially disposed slots 24, 24, herein shown as four in number, which slots are symmetrically arranged in the work-support. The table top 11 is formed with a similar group of slots 25, 25, Fig. 4, which may be of somewhat shorter length than the slots 24. When the work-support 18 is properly positioned upon the table top 11, the slots 24, 25 are coincident, their inner ends being the same distance from the axis of the work-support. Extending through the respective slots 25 and located in slots 24 are the upper end portions of a plurality of movable fingers 26, 26. The lower ends of the fingers 26 are pivotally mounted in respective bearing blocks 27 that are mounted upon a vertically reciprocable plate or platform 28 located an appreciable distance below the table top 11. The said platform 28 is formed with a central aperture through which the post 19 extends, said post serving as a guide for the said platform.

The bearing blocks 27 are disposed in the same vertical planes as the respective slots 24 of the work-support 18, but are somewhat farther from the extended axis of the work-support than are the inner ends of the said slots 24. Thus the fingers 26 always incline toward each other with their free ends closer together than their pivoted ends. The upper end portions of the fingers 26 extend an appreciable distance above the work-support 18 when the apparatus is in the inoperative position shown in Fig. 1, said upper end portions being outwardly bent, at an angle to the lower portion of the fingers, so that they are disposed substantially in vertical position. The inclined fingers 26 rest against the inner or closed ends of slots 24 in the work-support 18, which is stationary; consequently their deviation from vertical position varies with the raising and lowering of the platform 28 on which their bearing blocks 27 are mounted. Thus, when the platform 28 is lowered, for example, from the full line position of Fig. 1 to the broken line position of the same figure, the fingers move to a more nearly erect position as shown. During such movement the end walls of the slots 24, against which the fingers rest, act as fulcrums for the fingers, and the end portions of the fingers above said fulcrums move radially outwardly with relation to the work support, the fingers thus constituting, in effect, levers of the first class. It is this outward movement of the terminal portion of the fingers that is utilized to stretch the workpiece 15 as presently will be explained.

As shown in Figs. 1 and 2, the raising and lowering of the platform 28 is manually effected, and to this end the said platform is provided on its under side with stiffening webs 30, 30 disposed at right angles to each other, and pivotally connected to diametrically opposite webs, at the outer margins thereof, are two downwardly extending links 31. At their lower ends the links 31 are pivotally connected at 32 to respective parallel levers 33, 33 that are pivoted at 34, Fig. 2, on the frame 10 at the rear thereof. At their forward ends the levers 33 are connected to each other by a cross-piece 35 and secured to the latter and extending forwardly therefrom beyond the front of the apparatus is a pedal or foot lever 36. The latter normally is maintained in elevated position against transverse portions of the frame 10, as shown in Fig. 2, and to this end a cross-arm 37 is fixed to the foot lever and projects laterally from opposite sides thereof. Tension springs 38 are connected to the respective ends of cross-arm 37 and to fixed points on the under side of table top 11 so as normally to exert an upward pull on the foot lever, and thereby to hold the platform 28 and tire-engaging fingers 26 in elevated, inoperative position.

In the operation of the apparatus, assuming the latter to be in the full-line inoperative position shown in Fig. 1, a wheel 13 is mounted upon the work-support 18 where it rests in the concavity 21, the stud 22 serving to center the wheel. One side of the rim portion of the wheel, in which the wheel groove 14 is located, rests flush upon the work-support, the perimeter of the wheel being disposed adjacent to, but not in contact with, the end portions of the fingers 26 that extend upwardly through the slots 24 of the work-support. After the wheel 13 is mounted, a rubber tire 15 is mounted upon the fingers 26 as shown, which mounting readily may be effected by slightly deforming the tire. With the work-pieces in position, operation of the apparatus is effected simply by depressing the pedal end of the foot lever 36 against the tension of springs 38.

Operation of the foot lever 36 as described draws the platform 28 downwardly to the position shown in broken lines in Fig. 1, with the result that the fingers 26 with the tire 15 carried thereby are moved downwardly. Because of the angular position of the fingers 26, movement thereof relatively of the closed ends of slots 24 causes the free ends of said fingers to swing outwardly, radially of the work-support 18 and wheel 13 thereon, with the result that the tire 15 is stretched circumferentially to greater size than the wheel 13, and thus is enabled to move into circumscribing relation to the latter as its downward movement brings its central plane into coincidence with the central plane of the said wheel. Descent of the tire 15 ceases when it rests upon the top of the work-support 18, but the fingers 26 continue to move downwardly and thereby are withdrawn from engagement with the tire. The inherent elasticity of the latter then causes it to contract to its normal diameter, and it snaps into place in the peripheral groove of the rim of the wheel 13. The wheel with tire thereon is then manually removed from the apparatus, and the foot lever 36 is permitted to rise, thus raising the platform 28 and fingers 26 to their normal inoperative position.

This completes a cycle of operation, which is repeated as rapidly as work can be mounted in the apparatus.

The invention is simple in construction, rapid and efficient in operation, and achieves the other advantages set out in the foregoing statement of objects.

The embodiment of the invention shown in Fig. 5 is essentially similar to that previously described, and differs therefrom solely in the means employed to actuate the apparatus, power being employed in lieu of manual effort. As shown in Fig. 5, the platform 28 carrying fingers 26 is mounted upon the upper end of the piston rod 40 of a vertically arranged fluid pressure operated cylinder 41 that is pivotally mounted at its lower end upon the shelf 20. Inlet-and-outlet pipes 42, 43 are provided for charging and discharging opposite ends of the cylinder in alternation to effect lowering and raising of the platform 28, and thereby to operate the fingers 26 in the manner previously described. A plurality of guide rods 44 secured at their opposite ends in the shelf 20 and table top 11 are slidingly received in suitable apertures or slots (not shown) in the platform 28, thus serving to guide the latter and to prevent rotary movement thereof. The work-support 18 is secured to the table top in any suitable manner, and is provided with an upstanding axial stud 45. The fluid conducting pipes 42, 43 extend to the usual operating valve as is well understood.

Other modification may be resorted to without departing from the spirit of the invention or the scope thereof as defined by the appended claims.

What is claimed is:

1. In a device of the character described the combination of a table having a plurality of spaced openings in the top thereof, a wheel support on the top of said table and having a plurality of radial slots disposed outwardly of the grooved rim portion of a wheel thereon, said slots being in vertical alignment with said openings, a finger extending through each alined opening and slot and adapted to support above a wheel on said wheel support an endless elastic tire upon the upper end portions of the fingers by engagement with the inner circumference of said tire, the outer periphery of said rim portion being of greater diameter than the inner periphery of said tire both before and after the tire is mounted on said rim, said fingers inclining toward the axis of said wheel support at all times and bearing against the inner ends of the radial slots therein, means for moving the fingers and tire downwardly while the inner ends of said slots act as fulcrums for the fingers to move the latter outwardly and stretch the tire circumferentially until the latter is in circumscribing relation to the wheel, said downward movement carrying the upper ends of said fingers below the top face of said wheel support whereby said fingers are withdrawn from engagement with the tire and the latter snaps into the groove of said rim.

2. In a device of the character described the combination of a wheel support comprising a circular structure having a concavity in its top face to receive the bulging medial portion of a wheel while the grooved rim portion of the wheel rests flush against the top face of the support, said support formed with radial slots disposed outwardly of the rim portion of a wheel thereon, respective fingers extending through said slots and adapted to support above a wheel on said wheel support an endless elastic tire upon the upper end portions of the fingers by engagement with the inner circumference of said tire, the outer periphery of said rim portion being of greater diameter than the inner periphery of said tire both before and after the tire is mounted on said rim, said fingers inclining toward the axis of said wheel support at all times and bearing against the inner ends of the radial slots therein, means for moving the fingers and tire downwardly while the inner ends of said slots act as fulcrums for the fingers to move the latter outwardly and stretch the tire circumferentially until the latter is in circumscribing relation to the wheel, said downward movement carrying the upper ends of said fingers below the top face of said wheel support whereby said fingers are withdrawn from engagement with the tire and the latter snaps into the groove of said rim.

ROBERT L. SHERRICK.

REFERENCES CITED

The following references are of record in the file of this patent:

UNITED STATES PATENTS

| Number | Name | Date |
| --- | --- | --- |
| 244,365 | Anderson | July 19, 1881 |
| 560,354 | Hain | May 19, 1896 |
| 1,578,760 | Replogle | Mar. 30, 1926 |

FOREIGN PATENTS

| Number | Country | Date |
| --- | --- | --- |
| 627,563 | Germany | Mar. 18, 1936 |